US010318693B1

(12) United States Patent
Viswanathan et al.

(10) Patent No.: US 10,318,693 B1
(45) Date of Patent: Jun. 11, 2019

(54) BALANCED SCALED-LOAD CLUSTERING (71) Applicant: Cadence Design Systems, Inc., San Jose, CA (US)

(72) Inventors: Natarajan Viswanathan, Austin, TX (US); Zhuo Li, Austin, TX (US); Charles Jay Alpert, Cedar Park, TX (US); William Robert Reece, Over (GB); Thomas Andrew Newton, Great Cambourne (GB)

(73) Assignee: Cadence Design Systems, Inc., San Jose, CA (US)

( * ) Notice: Subject to any disclaimer, the term of this patent is extended or adjusted under 35 U.S.C. 154(b) by 23 days.

(21) Appl. No.: 15/690,043

(22) Filed: Aug. 29, 2017

(51) Int. Cl.
*G06F 17/50* (2006.01)

(52) U.S. Cl.
CPC ................ *G06F 17/5072* (2013.01)

(58) Field of Classification Search
USPC ........................................... 716/120
See application file for complete search history.

(56) References Cited

U.S. PATENT DOCUMENTS 5,309,372 A * 5/1994 Marui ................. G06F 17/5077
716/128
2014/0298283 A1* 10/2014 Chen ................... G06F 17/5068
716/114

* cited by examiner

Primary Examiner — Bryce M Aisaka
(74) Attorney, Agent, or Firm — Schwegman Lundberg & Woessner, P.A.

(57) ABSTRACT

Aspects of the present disclosure address improved systems and methods for designing an integrated circuit design clock tree structure with scaled-load balanced clusters. Consistent with some embodiments, the system may include a clock tree synthesis (CTS) tool configured to recursively group pins to form a set of clusters that are balanced according to a scaled load. During the recursive grouping, the CTS tool scales actual loads of clusters in accordance with a scaling factor that is based on the radius of the cluster. In this way, the scaling factor penalizes large cluster spans during recursive clustering, thereby producing a clock tree structure that meets design rule constraints.

20 Claims, 8 Drawing Sheets

BALANCED SCALED-LOAD CLUSTERING

TECHNICAL FIELD

The present disclosure generally relates to the technical field of integrated circuit (IC) design. In particular, the present disclosure addresses systems and methods for designing a clock tree for an IC.

BACKGROUND

An integrated circuit (IC) layout specifies portions of various components of an IC. When the IC is to include a large number of registers, latches, flip-flops and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of fan-out buffers. A clock tree includes a hierarchy of fan-out buffers (which may or may not invert the clock signal) for fanning the clock tree out from one or more buffers at a top level of the hierarchy to a large number of buffers at the lowest level of the hierarchy that drive the clock inputs of the sinks.

After establishing positions of all fan-out buffers and routing signal paths between the buffers and the sinks, a clock tree synthesis (CTS) tool estimates the path delays from the clock tree root to all sinks and then inserts additional buffers into various branches of the clock tree as needed to reduce variations in path delays to the sinks, thereby balancing the clock tree. Conventional approaches to positioning fan-out buffers involve grouping sinks into a set of clusters such that each cluster has no more than the number of sinks that can be driven by a single fan-out buffer. Sinks are typically clustered using one of two approaches—a geometry-based approach and a load-based approach.

In an example of the conventional geometry-based approach to clustering, sinks are grouped into clusters such that the clusters have approximately equal spans. With this approach, a portion of the clusters may be sparsely populated with sinks while other clusters may be densely populated with sinks. The geometry-based approach may result in a large number of clusters, which may increase power consumption. Further, the geometry-based approach may be overly time consuming for designs with a large number of sinks.

In an example of the conventional load-based approach to clustering, sinks are grouped into clusters such that the clusters have approximately equal loads (e.g., total pin capacitance). However, this approach frequently results in clusters with large spans that potentially violate slew and skew constraints for the design. Further, the conventional load-based approach fails to account for loading effects of wiring.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure include software stored on computer-readable media which, when read and executed by a machine, configures the machine to include a clock tree synthesis (CTS) tool. As noted above, some conventional techniques for clock tree generation use geometry-based clustering approaches that do not address load balancing. Other conventional techniques that do address load balancing do not consider the impact of cluster-span (e.g., cluster radius) in performing clustering. As an example, these conventional techniques do not account for wire capacitance and other wire effects in performing load-balanced clustering.

To address these forgoing problems, among others, the CTS tool of the present disclosure is configured to perform load-balanced clustering using a scaled cluster load rather than the actual cluster load. In performing such load-balanced clustering, the CTS tool scales the actual load of each cluster using a cluster-span based scaling factor, and balances the scaled-load during the recursive clustering step of clock tree construction. The CTS tool determines the scaling factor for each cluster based on a maximum capacitance target determined for each given cluster radius. In this way, the scale factor creates a penalty during the recursive clustering for large cluster spans (e.g., large cluster radius) thereby producing clock tree structures that are design rule violation free (e.g., clock tree structures that meet slew and skew targets) and improving clock buffer count, design area, and power consumption.

Figure 1:
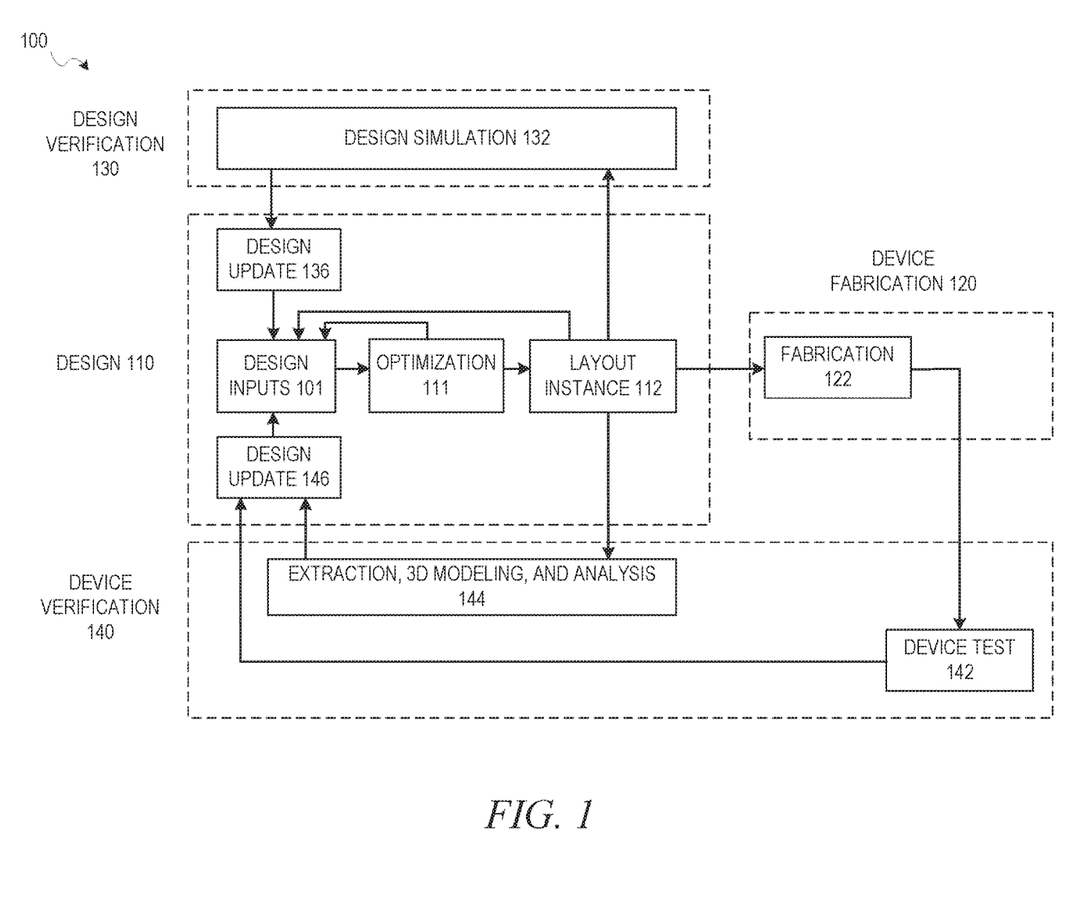
FIG. 1 is a diagram illustrating a possible design process flow which includes elements for constructing a balanced clock tree using recursive clustering, according to some example embodiments.

FIG. 1 is a diagram illustrating one possible design process flow which includes elements for constructing a balanced clock tree using recursive clustering, according to some embodiments. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where a CTS tool generates initial layouts for a balanced clock tree structure and sinks, before adjustments are made to ensure that timing requirements for each sink are met. The initial strategy, tactics, and context for the device to be created are also generated in the design input operation 101, depending on the particular design algorithm to be used.

In some embodiments, following an initial selection of design values in design input operation 101, the CTS tool performs clock tree synthesis; associated timing analysis and optimization, according to various embodiments, occurs at optimization operation 111, along with any other automated design processes. Design constraints for a clock tree structure and sinks which receive a clock signal from the clock tree structure may be initiated with design inputs in design input operation 101, and then may be analyzed using timing analysis according to various embodiments. While design flow 100 shows such optimization occurring prior to layout instance 112, such timing analysis and optimization may be performed at any time to verify operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating a balanced clock tree structure may therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D modeling, and analysis 144 operations. Once the device is generated, the device can be tested as part of device test 142 operations, and layout modifications generated based on actual device performance.

As described in more detail below, design updates 136 from design simulation 132; design updates 146 from device test 142 or extraction, 3D modeling, and analysis 144 operations; or direct design input operation 101 may occur after an initial layout instance 112 is generated. In various embodiments, whenever design inputs are used to update or change an aspect of a circuit design, a timing analysis and optimization operation 111 may be performed.

In accordance with conventional load balancing techniques, elements in an IC design that receive a clock signal, which are referred to as "sinks," are grouped to create clusters such that the load of each cluster (e.g., total cluster capacitance) is identical. However, though the clusters created using the conventional load balancing techniques are load balanced, the resulting cluster may have large spans that may negatively impact the skew (e.g., the difference between the minimum and maximum latency from a driver to its sink pins) of the clusters, which may give rise to a design rule violation with respect to a target skew for the IC design.

Figure 2:
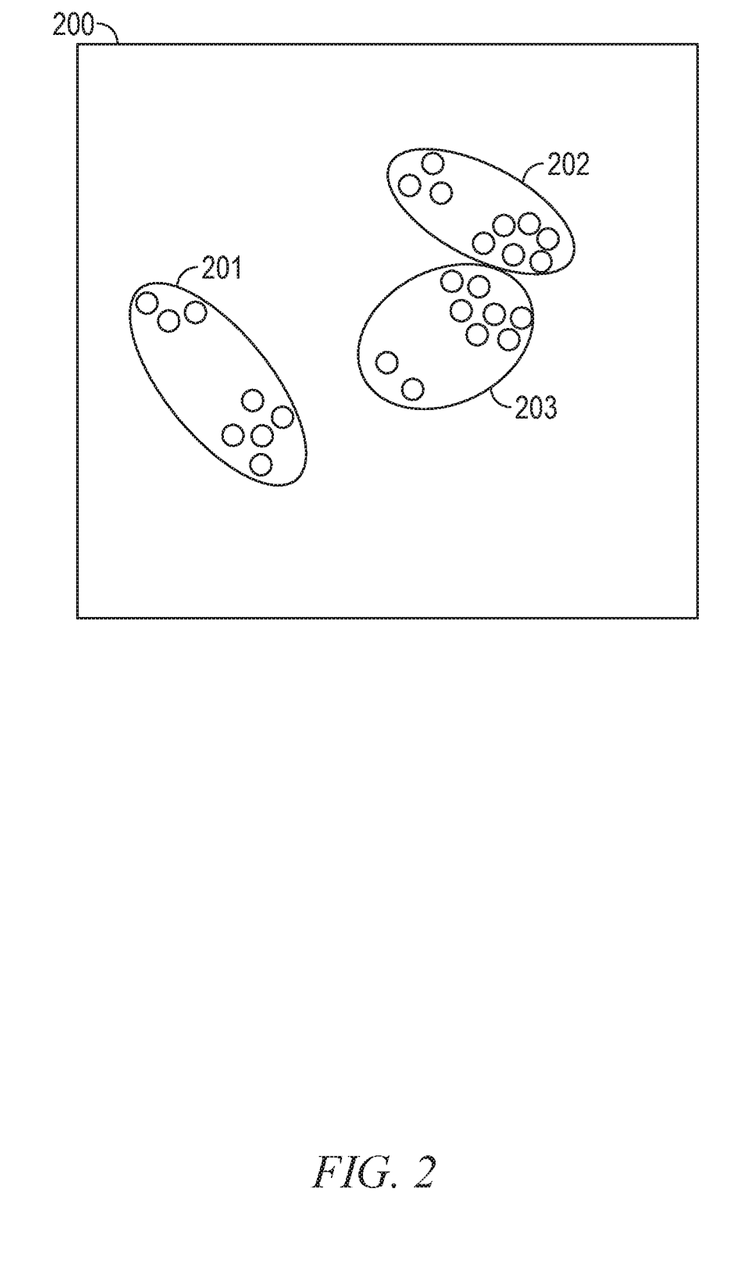
FIG. 2 is a conceptual diagram illustrating a set of clusters created while constructing a balanced clock tree in accordance with some example embodiments of the present disclosure.

FIG. 2 is a conceptual diagram illustrating a set of clusters 200 created while constructing a balanced clock tree structure in accordance with some example embodiments of the present disclosure. To address the forgoing issues with conventional load balancing techniques, among others, a CTS tool creates clusters 201-203 such that a scaled-load, rather than actual load, of the clusters 201-203 is the same (or nearly the same). The loads of each of the clusters 201-203 are "scaled" to account for pin and wire loading (e.g., pin and wire capacitance) as well as other wiring effects. By scaling the load in this manner, long spans in clusters are penalized to reduce spans of the clusters that are created, thereby improving the skew and slew of the clusters while also increasing consistency of spans between clusters.

Figure 3:
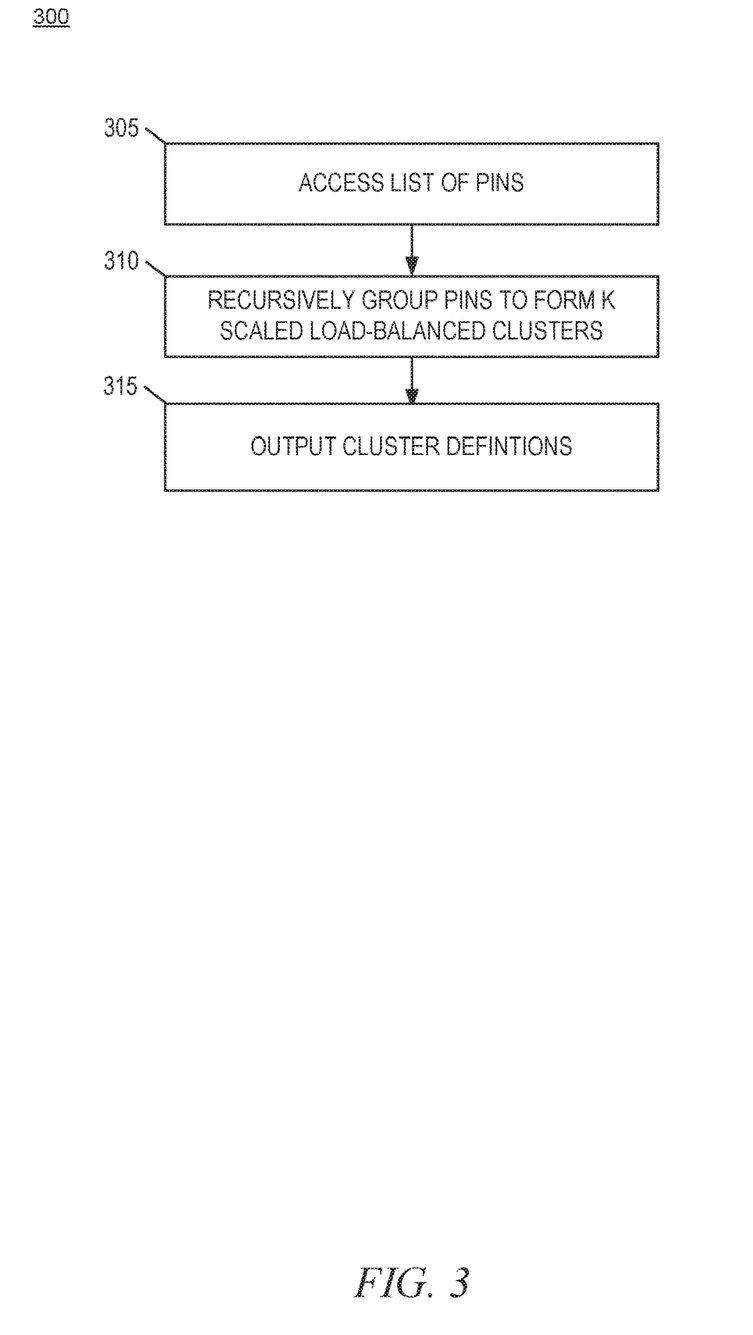
FIGS. 3-5 are flowcharts illustrating operations of a method for constructing a balanced clock tree using recursive clustering, according to some example embodiments.
Figure 4:
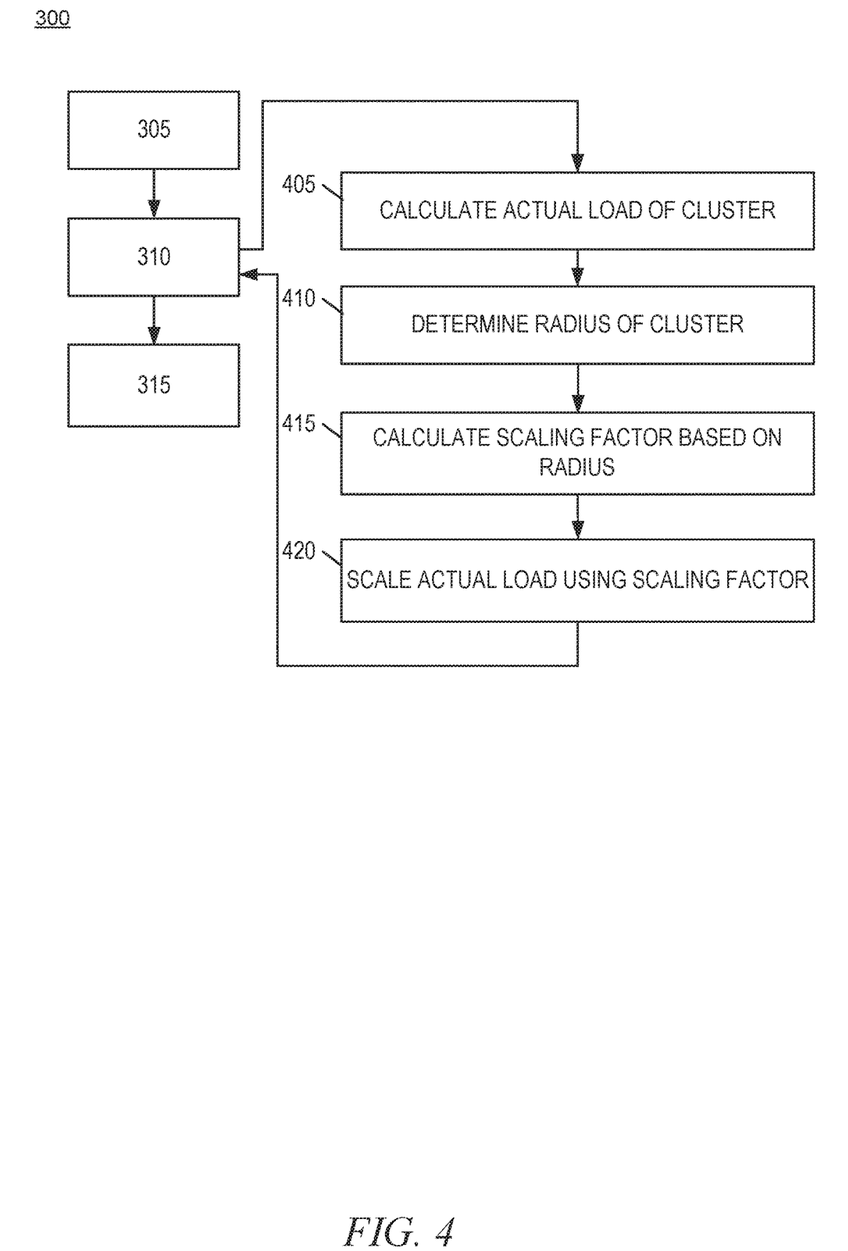
Figure 5:
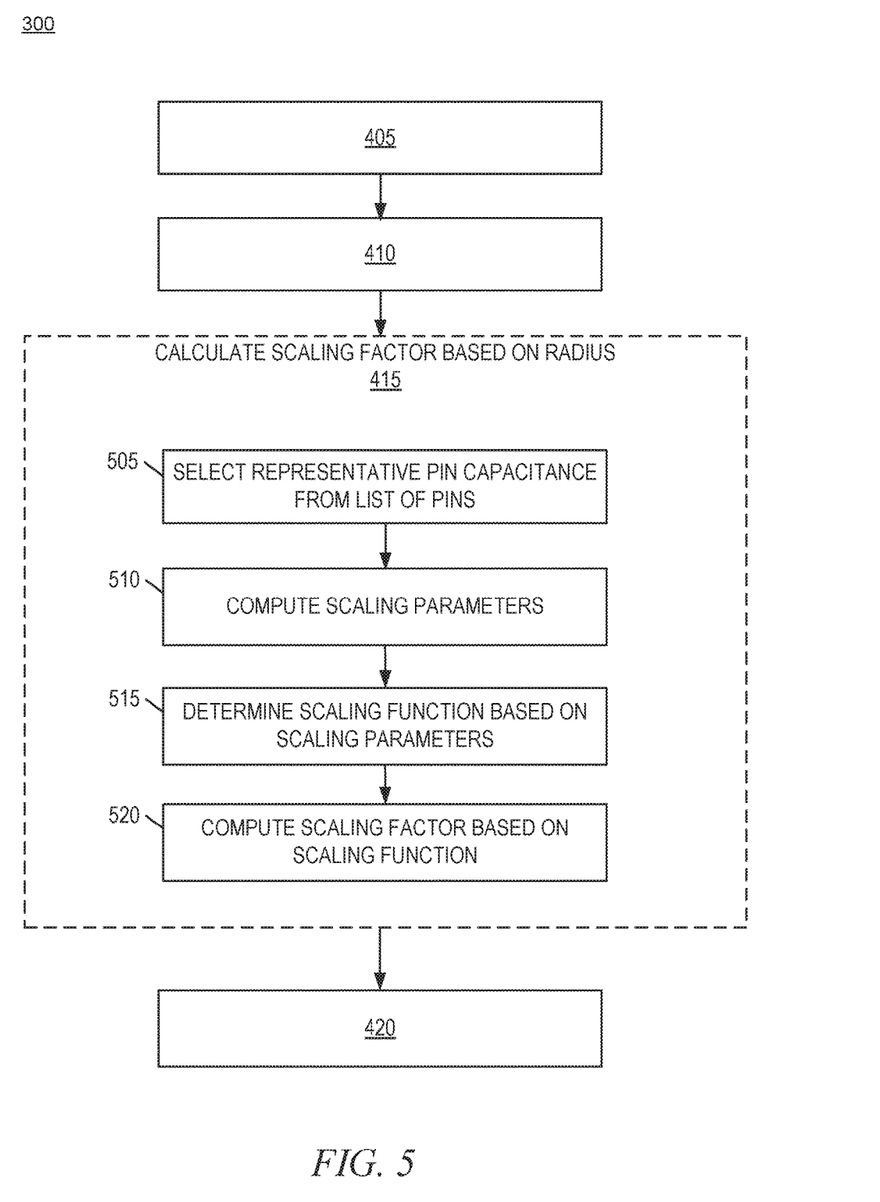

FIGS. 3-5 are flowcharts illustrating operations of a method for constructing a balanced clock tree using recursive clustering, according to some example embodiments. The method 300 may be embodied in computer-readable instructions for execution by one or more processors such that the operations of the method 300 may be performed in part or in whole by a computing device (e.g., machine 800 of FIG. 8). Such an embodiment may include software executed on an EDA computing device that includes a CTS tool configured to generate a balanced clock tree structure; accordingly, the method 300 is described below by way of example with reference thereto. However, it shall be appreciated that the performance of method 300 is not intended to be limited to such hardware configurations, and at least some of the operations of the method 300 may be deployed on various other hardware configurations. For example, some embodiments comprise a device that includes a memory with a circuit design, and processing circuitry configured into a special device to perform the operations of method 300.

Referring to FIG. 3, at operation 305, the CTS tool accesses a list of pins of an IC design. The list of pins may, for example, correspond to input pins of flops or IP blocks for lowest-level (e.g., leaf level) clustering or input pins of clock drivers or clock gates for higher levels of clustering.

The CTS tool, at operation 310, recursively groups pins from the list of pins to form K scaled-load balanced clusters. In the context of method 300, K is a predefined value. Initially, K may be set to an initial predefined value (e.g., a default value); however, in some embodiments, the method 300 may be repeatedly performed for different values of K. For example, the method 300 may be iteratively performed and the value of K may be increased with each iteration based on a determination that one or more clusters violate one or more target constraints (e.g., the clusters do not meet the target constraints). This iterative process may be repeated until every formed cluster meets a target constraint (e.g., load, skew, slew, etc.).

In grouping the pins to form the scaled-load balanced clusters, the CTS tool may apply one of many known algorithms to form clusters of approximately equal scaled-loading. For example, the CTS tool may group pins based on a metric for proximity (e.g., Manhattan distance between sinks) subject to target loading constraints. Contrary to traditional techniques for load balancing, the CTS tool balances clusters using a scaled load determined by scaling actual cluster loads with a scaling factor determined based in part on cluster radius. Further details regarding the scaling of the load are discussed below in reference to FIGS. 4-7.

At operation 315, the CTS tool outputs cluster definitions corresponding to the K clusters. The cluster definitions define the groupings of the pins according to the K clusters. In outputting the cluster definitions, the CTS tool may supply the cluster definitions in an appropriate file format to one or more internal or external systems, or the CTS tool may store the cluster definitions in a database, in-memory, or on disk for subsequent use in one or more processes.

As shown in FIG. 4, the method 300 may, in some embodiments, include operations 405, 410, 415, and 420. According to some embodiments, the operations 405, 410, 415, and 420 may be performed in parallel with or as part of (e.g., a subroutine) operation 310, where the CTS tool recursively groups pins to form K clusters. Although operations 405, 410, 415, and 420 are described in reference to a single cluster, it shall be appreciated that the operations 405, 410, 415, and 420 may be repeated for each formed cluster and at each iteration of the recursive grouping.

As shown, the CTS tool calculates an actual load of a cluster, at operation 405. In calculating the actual load of the cluster, the CTS tool determines the total pin capacitance and total wire capacitance of the cluster and calculates the sum of these capacitances to determine the actual load. The CTS tool may use various methods to estimate the required wiring resource (length) for the purpose of wire capacitance calculation. For example, the CTS tool may use the bounding box of all the pins, route the pins using a Steiner tree, etc. Additionally, the wire capacitance calculation may include specific parameters dependent on which metal layer the routes may actually be created on.

At operation 410, the CTS tool determines a radius of the cluster. The CTS tool determines the radius of the cluster by determining a maximum distance from a center of the cluster to a pin in the cluster. The center of the cluster may, for example, correspond to a center of mass of the cluster, a centroid of the cluster, or an average distance of the sinks from the center of mass or centroid of the cluster. As another example, the CTS tool may sort the distance values of the sinks from the center of mass or centroid of the cluster in a non-decreasing order and calculate the average of a small fraction of the largest distances (as in, top X % of the distance values, where X could be a small value like 1, 2, 5, etc.).

The CTS tool, at operation 415, calculates a scaling factor for the cluster based in part on the radius of the cluster. The scaling factor is calculated such that longer spans are penalized (e.g., the larger the radius of the cluster, the larger the scaling factor). Further details regarding the calculation of the scaling factor are discussed below in reference to FIGS. 5-7.

At operation 420, the CTS tool scales the actual load of the cluster using the scaling factor. In other words, the CTS tool applies the scaling factor (determined at operation 415) to the actual load (determined at operation 405). For example, the CTS tool may multiply the actual load by the scaling factor. The application of the scaling factor to the actual load yields the scaled load for the cluster.

As shown in FIG. 5, the operation 415 of the method 300, where the CTS tool calculates the scaling factor for a cluster, may include operations 505, 510, 515, and 520, consistent with some embodiments. At operation 505, the CTS tool selects a representative capacitance from the list of pins. For example, the CTS tool may select the median pin capacitance among all sink pin capacitances.

The CTS tool, at operation 510, uses the representative capacitance to compute scaling parameters, which are used to generate a scaling function. The scaling parameters include a minimum and maximum capacitance that can be driven by the cluster's clock driver at a corresponding maximum radius and representative minimum radius to account for some degree of wiring effects. The maximum radius corresponds to the largest possible distance between the cluster's clock driver and a sink in the cluster that does not violate the slew target, where the sink has the representative capacitance. The minimum capacitance is the maximum load capable of being driven at the maximum radius while satisfying all design rule constraints (e.g., slew target). Accordingly, in calculating the scaling parameters, the CTS tool determines the largest possible distance between the clock driver and a sink in the cluster and the corresponding load that can be driven by the cluster's clock driver while satisfying design rule constraints.

Conversely, the minimum radius is the shortest distance between the cluster's clock driver and a sink with representative capacitance and the maximum capacitance is the maximum load capable of being driven at the minimum radius while satisfying all design rule constraints (e.g., slew target). Accordingly, in calculating the scaling parameters, the CTS tool uses a representative value for the minimum radius to account for some degree of wiring effects (e.g., 1/10 of maximum radius) and the corresponding load that can be driven by the cluster's clock driver while satisfying design rule constraints.

Figure 6A:
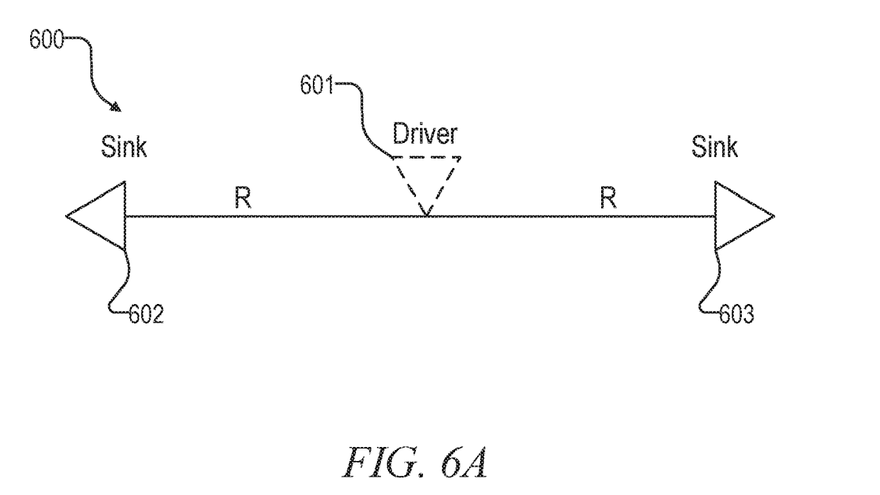
FIGS. 6A and 6B are conceptual diagrams that graphically illustrate an operation of computing scaling parameters, which may be performed as part of the method for constructing the balanced clock tree, according to some example embodiments.

As an example of the forgoing, with reference to FIG. 6A, in determining the maximum radius and minimum capacitance, the CTS tool may construct a linear clock tree topology 600 with a clock driver 601 that is centered equidistant of sinks 602 and 603, where the load of sinks 602 and 603 corresponds to the representative pin capacitance selected at operation 505. In FIG. 6A, "R" is used to denote the distance between the clock driver 601 and each of the sinks 602 and 603. In this example, the maximum radius is calculated by determining the maximum value of R that does not result in a violation of the slew target at either of the sinks 602 and 603. The CTS tool may initially places a sink right next to a clock driver with say almost zero wire length where it will generally satisfy the slew target. The CTS tool increases the distance between the sink and driver right up until the point where it violates the slew target. The minimum capacitance may be calculated as follows:

$$C_{MIN}=2*(R_{MAX}*\text{unit\_wire\_cap}+C_{SINK})$$

Where $C_{MIN}$ is the minimum capacitance; $R_{MAX}$ is the maximum radius; unit_wire_cap is the per unit wire capacitance; and $C_{SINK}$ is the representative pin capacitance selected at operation 505.

Figure 6B:
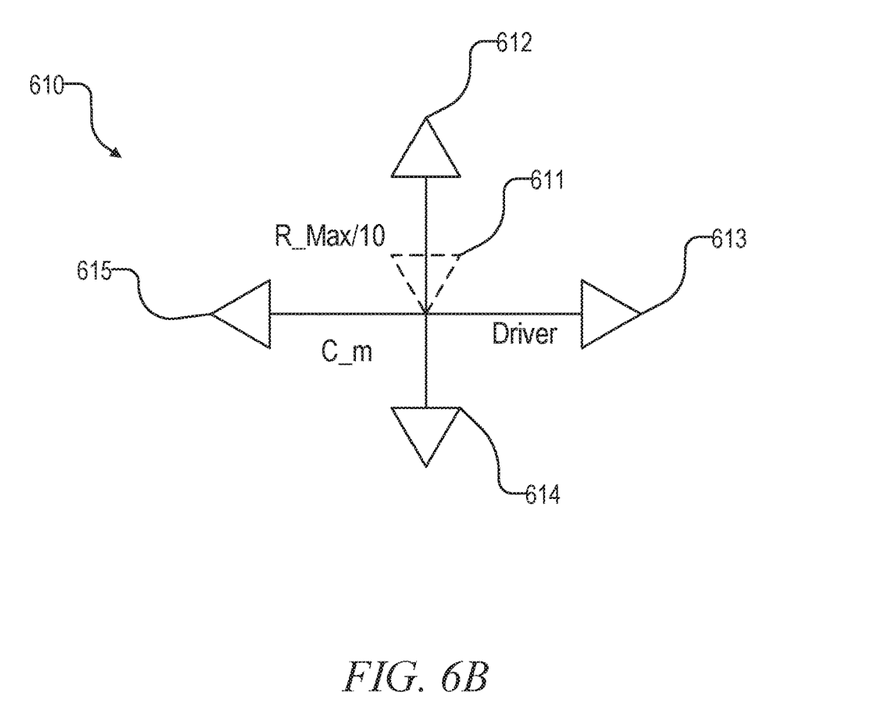

In determining the minimum radius and maximum capacitance, the CTS tool may, as shown in FIG. 6B, construct a cross clock tree topology 610 where a clock driver 611 is positioned at the center of sinks 612-615. Each of the sinks 612-615 is located at a distance from the clock driver 611 that may be a predefined fraction of the maximum radius. For example, as shown, the sinks 612-615 are positioned such that the distance between the clock driver 611 and each of the sinks 612-615 is one tenth of the maximum radius (i.e., $R_{MAX}/10$). In this example, the distance between the clock driver 611 and each of the sinks 612-615 is the minimum radius. To determine the maximum capacitance, the CTS tool assumes the load of each of the sinks 612-615 is the same (e.g., each sink has the same capacitance) and determines the maximum possible load for each of the sinks 612-615 that does not result in a violation of the slew target at any of the sinks 612-615, which in the context of FIG. 6B is denoted as $C_M$. The CTS tool may then determine the maximum capacitance as follows:

$$C_{MAX}=4*((R_{MIN}*\text{unit\_wire\_cap})+C_M)$$

Where $C_{MAX}$ is the maximum capacitance; $R_{MIN}$ is the minimum radius; and unit_wire_cap is the per-unit wire capacitance.

Figure 7:
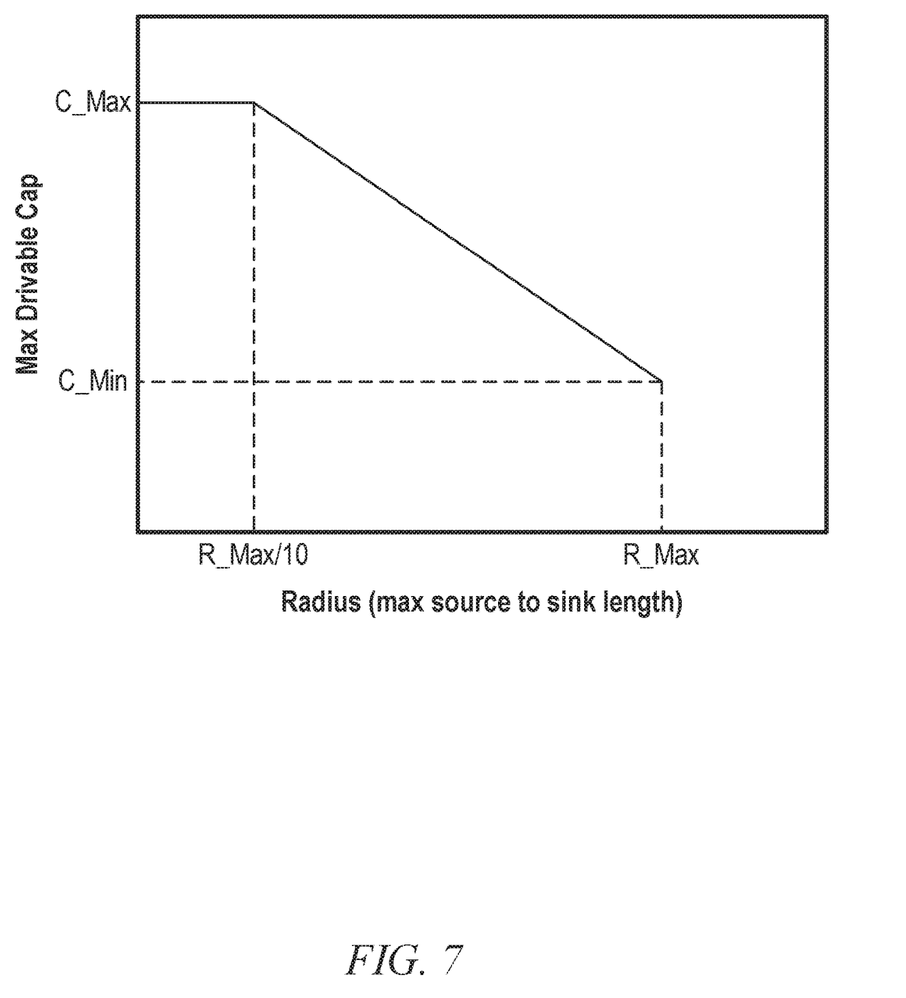
FIG. 7 is a graph illustrating an example scaling function derived from the scaling parameters, according to some example embodiments.

Returning to FIG. 5, at operation 515, the CTS tool determines a scaling function for the cluster based on the scaling parameters. The scaling function describes the relationship between cluster radius and the capacitance capable of being driven at each cluster radius. As an example, FIG. 7 is a graph that illustrates a plot of an example scaling function derived from the scaling parameters, according to some example embodiments. As shown, at or below the minimum cluster radius (i.e., "$R_{MIN}$"), the clock driver is capable of driving the maximum capacitance (i.e., "$C_{MAX}$"). Further, at the maximum cluster radius (i.e., "$R_{MAX}$"), the clock driver is only capable of driving the minimum capacitance (i.e., "$C_{MIN}$").

Returning to FIG. 5, at operation 520, the CTS tool computes the scaling factor for the cluster using the scaling function (determined at operation 515). For example, the CTS tool may compute the scaling factor using the following equation:

$$\text{Scaling Factor} = C_{MAX}/C_R$$

Where "$C_{MAX}$" is the maximum capacitance (determined at operation 510) and "$C_R$" is the maximum capacitance capable of being driven at the radius of the cluster, which is determined from the scaling function. In this way, the CTS tool may calculate the scaling factor by dividing the maximum capacitance capable of being driven at the minimum radius of the cluster by the capacitance capable of being driven at the actual radius of the cluster.

It shall be appreciated that, in some embodiments, operations 505, 510, and 515 may be performed to determine the scaling function a priori, before actually clustering the pins. In this way, the scaling function may be used to determine the scaling factor for each cluster (in the manner described above) during clustering.

Figure 8:
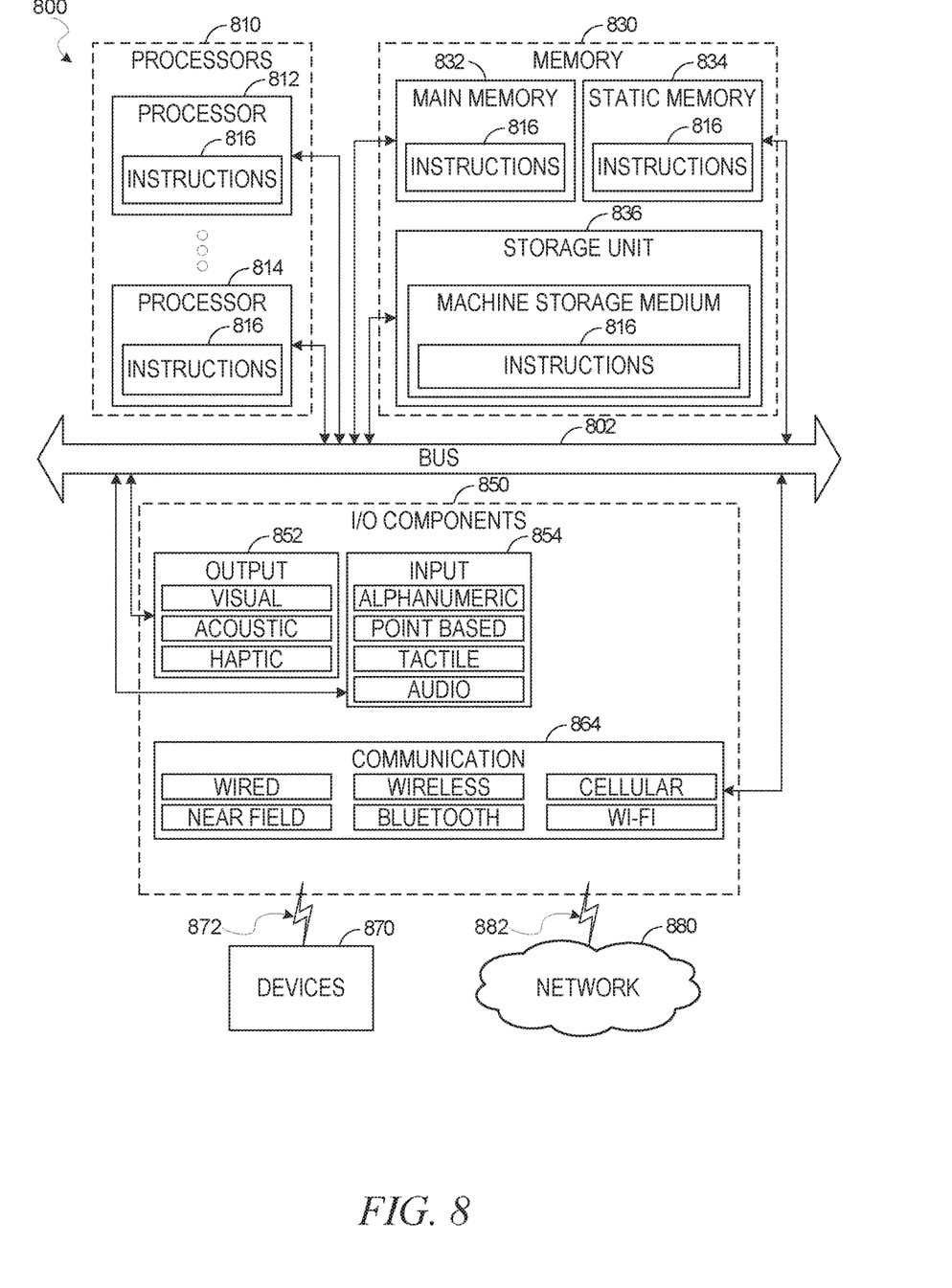
FIG. 8 is a diagrammatic representation of a machine in the example form of a computer system within which a set of instructions for causing the machine to perform any one or more of the methodologies discussed herein may be stored and executed.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 300. Additionally, or alternatively, the instructions 816 may implement the design flow of FIG. 1. The instructions 816 transform the general, non-programmed machine 800 into a particular machine 800 programmed to carry out the described and illustrated functions in the manner described here. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, both accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near-field communication (NFC) components, Bluetooth, Wi-Fi, and other communication components to provide communication via other modalities. The devices 870 may be another machine or any of a wide variety of peripheral devices (e.g., a peripheral device coupled via a universal serial bus (USB)).

Executable Instructions and Machine Storage Medium

The various memories (e.g., 830, 832, 834, and/or memory of the processor(s) 810) and/or the storage unit 836, may store one or more sets of instructions and data structures (e.g., software) embodying or utilized by any one or more of the methodologies or functions described herein. These instructions, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors of a machine; and
a computer storage medium storing instructions, which when executed by the one or more processors, configure the machine to perform operations comprising:
accessing an integrated circuit (IC) layout that includes a list of pins;
recursively grouping pins to form a set of clusters that are balanced according to a scaled-load, each cluster including a group of pins selected from the list of pins, the recursively grouping the pins including:
for each cluster in the set of clusters, calculating an actual load based on a combination of pin capacitance and wire capacitance of the cluster, and
for each cluster in the set of clusters, determining the scaled-load by applying a scaling factor to the actual load, the scaling factor being based in part on a radius of the cluster; and
providing cluster definitions as output, the cluster definitions defining the set of clusters that are balanced according to the scaled-load.

2. The system of claim 1, wherein determining the scaled-load comprises:
calculating the radius of the cluster; and
calculating the scaling factor for the cluster based on the radius of the cluster.

3. The system of claim 2, wherein the calculating of the radius of the cluster comprises:
determining a maximum distance from a center of the cluster to a pin from the group of pins forming the cluster.

4. The system of claim 2, wherein the calculating of the scaling factor comprises:
selecting a representative pin capacitance from the group of pins of the cluster;
computing scaling parameters for the cluster;
determining a scaling function based on the scaling parameters; and
using the radius to determine the scaling factor for the cluster from the scaling function.

5. The system of claim 4, wherein the scaling function describes a relationship between radius values and capacitance values.

6. The system of claim 4, wherein the scaling parameters include a maximum radius, a minimum radius, a maximum capacitance capable of being driven at the minimum radius, and a minimum capacitance capable of being driven at the maximum radius.

7. The system of claim 6, wherein:
the maximum radius corresponds to a length between a sink and a driver at which a slew at an input of the sink does not violate the target slew; and
the minimum radius is a predefined fraction of the maximum radius.

8. The system of claim 6, wherein using the radius to identify the scaling factor for the cluster from the scaling function comprises:
determining a capacitance value corresponding to the radius of the cluster based on the scaling function; and
dividing the maximum capacitance by the capacitance value corresponding to the radius of the cluster.

9. The system of claim 1, wherein calculating the actual load comprises calculating a sum of the pin capacitance and the wire capacitance of the cluster.

10. The system of claim 1, wherein:
the set of clusters is a first set of clusters having a first number of clusters; and
the operations further comprise:
grouping the pins to form a second set of clusters having a second number of clusters, the second number being less than the first number; and
determining a load of at least one cluster in the second set of clusters is above a target load;
wherein the grouping of the pins to form the first set of clusters is in response to determining the load of at least one cluster in the second set of clusters is above the target load.

11. A method comprising:
accessing an integrated circuit (IC) layout stored in memory that includes a list of pins;
recursively, using one or more hardware processors, grouping pins to form a set of clusters that are balanced according to a scaled-load, each of the clusters including a group of pins selected from the list of pins, the recursively grouping the pins including:

for each cluster in the set of clusters, calculating an actual load based on a combination of pin capacitance and wire capacitance of the cluster;

for each cluster in the set of clusters, scaling the actual load by applying a scaling factor to the actual load, the scaling factor being based in part on a radius of the cluster, the scaling of the actual load resulting in the scaled-load; and providing cluster definitions as output, the cluster definitions defining the set of clusters that are balanced according to the scaled-load.

12. The method of claim 11, wherein scaling the actual load comprises:

calculating the radius of the cluster; and calculating the scaling factor for the cluster based on the radius of the cluster.

13. The method of claim 12, wherein the calculating of the radius of the cluster comprises:

determining a maximum distance from a center of the cluster to a pin from the group of pins forming the cluster.

14. The method of claim 12, wherein the calculating of the scaling factor comprises:

selecting a representative pin capacitance from the group of pins of the cluster;

computing scaling parameters for the cluster;

determining a scaling function based on the scaling parameters; and using the radius to determine the scaling factor for the cluster from the scaling function.

15. The method of claim 14, wherein the scaling function describes a relationship between radius values and capacitance values.

16. The method of claim 14, wherein the scaling parameters include a maximum radius, a minimum radius, a maximum capacitance capable of being driven at the minimum radius, and a minimum capacitance capable of being driven at the maximum radius.

17. The method of claim 16, wherein using the radius to identify the scaling factor for the cluster from the scaling function comprises:

determining a capacitance value corresponding to the radius of the cluster based on the scaling function; and dividing the maximum capacitance by the capacitance value corresponding to the radius of the cluster.

18. The method of claim 11, wherein calculating the actual load comprises calculating a sum of the pin capacitance and the wire capacitance of the cluster.

19. A system comprising:

one or more processors of a machine; and a computer storage medium storing instructions, which when executed by the machine, cause the machine to perform operations comprising:

accessing an integrated circuit (IC) layout that includes a list of pins;

forming a set of clusters that are balanced according to a scaled-load, each cluster including a group of pins selected from the list of pins, the forming of the set of clusters including:

for each cluster in the set of clusters, calculating an actual load based on a combination of pin capacitance and wire capacitance of the cluster;

for each cluster in the set of clusters, calculating a scaling factor based in part of the radius of the cluster;

scaling the actual load of each cluster in accordance with the scaling factor, the scaling of the actual load yielding the scaled load; and providing cluster definitions as output, the cluster definitions defining the set of clusters that are balanced according to the scaled.

20. The system of claim 19, wherein the calculating of the scaling factor comprises:

selecting a representative pin capacitance from the group of pins of the cluster;

computing scaling parameters for the cluster;

determining a scaling function based on the scaling parameters; and using the radius to determine the scaling factor for the cluster from the scaling function.

* * * * *